United States Patent
Murray et al.

(10) Patent No.: US 8,040,221 B2
(45) Date of Patent: Oct. 18, 2011

(54) MOBILE RADIO FREQUENCY IDENTIFICATION READER

(75) Inventors: Donald L. Murray, Highland, IL (US); Gary D. Koval, Troy, IL (US); Karl L. Johnson, Seattle, WA (US); Gaylen Kenneth Cardwell, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 1203 days.

(21) Appl. No.: 11/743,546

(22) Filed: May 2, 2007

(65) Prior Publication Data

US 2008/0272914 A1 Nov. 6, 2008

(51) Int. Cl.
*H04Q 5/22* (2006.01)

(52) U.S. Cl. ............... 340/10.1; 340/825.49; 340/572.1; 340/668.1; 700/215; 310/310; 705/22

(58) Field of Classification Search ............. 340/825.49; 700/215; 310/310
See application file for complete search history.

(56) References Cited

U.S. PATENT DOCUMENTS

| | | | |
|---|---|---|---|
| 5,905,473 A * | 5/1999 | Taenzer | 343/834 |
| 5,914,671 A * | 6/1999 | Tuttle | 340/10.42 |
| 6,078,251 A * | 6/2000 | Landt et al. | 340/10.41 |
| 6,456,239 B1 | 9/2002 | Werb et al. | |
| 6,554,187 B2 | 4/2003 | Otto | |
| 6,600,418 B2 | 7/2003 | Francis et al. | |
| 6,700,493 B1 * | 3/2004 | Robinson | 340/573.1 |
| 6,859,757 B2 | 2/2005 | Muehl et al. | |
| 6,895,301 B2 * | 5/2005 | Mountz | 700/215 |
| 6,970,088 B2 | 11/2005 | Kovach | |
| 7,044,374 B2 * | 5/2006 | Allison et al. | 235/385 |
| 7,047,159 B2 | 5/2006 | Muehl et al. | |
| 7,117,374 B2 | 10/2006 | Hill et al. | |
| 7,118,029 B2 | 10/2006 | Nycz et al. | |
| 2001/0042786 A1 | 11/2001 | Reynolds et al. | |
| 2002/0038267 A1 | 3/2002 | Can et al. | |
| 2002/0167406 A1 | 11/2002 | Garber et al. | |
| 2003/0189094 A1 | 10/2003 | Trabitz | |
| 2004/0118916 A1 | 6/2004 | He | |
| 2004/0124982 A1 | 7/2004 | Kovach | |
| 2004/0227682 A1 * | 11/2004 | Anderson | 343/742 |
| 2004/0257202 A1 | 12/2004 | Coughlin et al. | |
| 2005/0021283 A1 | 1/2005 | Brinton et al. | |
| 2005/0029350 A1 | 2/2005 | Jusas et al. | |
| 2005/0040231 A1 | 2/2005 | Allison et al. | |
| 2005/0145187 A1 | 7/2005 | Gray | |
| 2005/0248454 A1 | 11/2005 | Hanson et al. | |
| 2006/0015408 A1 | 1/2006 | Brown | |
| 2006/0038077 A1 | 2/2006 | Olin et al. | |
| 2006/0054691 A1 | 3/2006 | Holloway et al. | |

(Continued)

*Primary Examiner* — Daniel Wu
*Assistant Examiner* — Frederick Ott
(74) *Attorney, Agent, or Firm* — Armstrong Teasdale LLP

(57) ABSTRACT

A mobile radio frequency identification (RFID) system is described that includes a wheeled cart, a RFID reader mounted to the wheeled cart, a computer mounted to the wheeled cart and communicatively coupled to the RFID reader, and a directional antenna capable of being communicatively coupled to the RFID reader and movably mounted to the wheeled cart. The system also includes at least one omni-directional antenna mounted to the wheeled cart and capable of being communicatively coupled to the RFID reader. The computer is configured to process data received from the RFID tags and further configured to allow a user to selectively couple one or both of the at least one omni-directional antenna and the directional antenna to the RFID reader.

20 Claims, 2 Drawing Sheets

U.S. PATENT DOCUMENTS

| | | |
|---|---|---|
| 2006/0145855 A1 | 7/2006 | Diorio et al. |
| 2006/0163430 A1 | 7/2006 | Cordina et al. |
| 2006/0180647 A1 | 8/2006 | Hansen |
| 2006/0186201 A1 | 8/2006 | Hart |
| 2006/0192003 A1 | 8/2006 | Chung |
| 2006/0214768 A1* | 9/2006 | Hermann ............... 340/5.61 |
| 2006/0220857 A1 | 10/2006 | August et al. |
| 2007/0008138 A1 | 1/2007 | Mosher, Jr. et al. |
| 2007/0008140 A1 | 1/2007 | Saarisalo et al. |
| 2007/0013244 A1* | 1/2007 | Kinkaid ............... 310/75 C |
| 2007/0018826 A1 | 1/2007 | Nowak et al. |
| 2008/0017709 A1* | 1/2008 | Kennedy ............... 235/385 |

* cited by examiner

MOBILE RADIO FREQUENCY IDENTIFICATION READER

BACKGROUND OF THE INVENTION

This invention relates generally to radio frequency identification, and more specifically, to a mobile radio frequency identification reader.

Certain industries are looking to their providers for capabilities in increased supply chain and inventory management, to provide total asset visibility. Radio frequency identification (RFID) is one emerging technology that can be utilized to provide at least a part of these capabilities. However, at least some known RFID readers are limited to a stationary location, sometimes referred to as a fixed location portal, or to a handheld configuration that reads RFID tags with a limited range, for example, two to six feet.

One of the key problems in determining total assets visibility is the time and process involved in locating, tracking, and documenting assets. In addition to the above, determination and maintenance of asset availability, serviceability of assets, a state of repair of the assets, and a return-to-service status for such assets have traditionally been difficult. Referring now to RFID, the utilization of substantially fixed location RFID devices (e.g., readers) typically requires transportation of at least some of the assets to and through a stationary, portal type RFID system. Such a process obligates resources and manpower. However, utilization of handheld RFID devices (e.g., readers) means that the assets must be within two to six feet of the handheld device, which is not always feasible. For example, such a handheld RFID device must be maneuvered side-to-side and up-and-down to scan a large area. Such maneuvering results in less-than-optimal scan results and limited reliability in the mass interrogation of assets.

As inferred above, disadvantages associated with current handheld RFID devices are reduced power output, range, and accuracy of data collection. For example, due to limited antenna read range and battery power, the handheld devices are limited to reading tagged items that are within, for example, two to six feet from the reader. Disadvantages associated with commercially available stationary or portal type RFID readers is limited flexibility; as all assets to be scanned must be transported to the fixed RFID reader location or portal.

BRIEF DESCRIPTION OF THE INVENTION

In one aspect, a mobile radio frequency identification (RFID) system is described that includes a wheeled cart, a fixed RFID reader, fixed reader antennas, and computer mounted to the wheeled cart, the computer being communicatively coupled to the RFID reader. The mobile RFID system further includes at least one omni-directional antenna and a directional antenna all of which are capable of being communicatively coupled to the RFID reader and movably mounted to the wheeled cart. The computer is configured to process data received from RFID tags and further configured to allow a user to selectively couple one or both of the at least one omni-directional antenna and the directional antenna to the RFID reader.

In another aspect, a radio frequency identification (RFID) system is provided that includes a RFID reader, a computer communicatively coupled to the RFID reader, a directional antenna capable of being communicatively coupled to the RFID reader, and at least one omni-directional antenna capable of being communicatively coupled to the RFID reader. The computer is configured for selectively coupling one or all of the omni-directional antenna for the mass-interrogation capability. The computer is also configured to selectively couple said directional antenna to the RFID reader for the focusing of RF energy in a specific direction.

In still another embodiment, a method for activating, receiving data from, and utilizing the data associated with a plurality of RFID tags within an environment is provided. In the method, the RFID tags are activated and the data is received utilizing an RFID reader, a directional antenna, and at least one omni-directional antenna. The provided method comprises navigating the RFID reader and the antennas along a route, selectively coupling the directional antenna and at least one omni-directional antenna to the RFID reader, based on a varying configuration of the RFID environment along the route, to activate the RFID tags with the RFID reader, receiving data at the RFID reader from one or more activated RFID tags, and relating the received data to an inventory of respective RFID tagged items within the environment as part of an asset management process for the RFID tagged items.

DETAILED DESCRIPTION OF THE INVENTION

To address the problems described above, the embodiments described herein may be utilized to quickly identify and record quantities of equipment, for example, emergency equipment, life limited equipment, parts within the interior of an aircraft, parts on the exterior of an aircraft, warehouse inventory, and tool accountability, both prior to and at completion of a maintenance action. The embodiments may be utilized in any number of other situations where total asset visibility is desired, in a variety of environments, while not limiting the user(s) to a stationary or handheld radio frequency identification (RFID) device.

Figure 1:
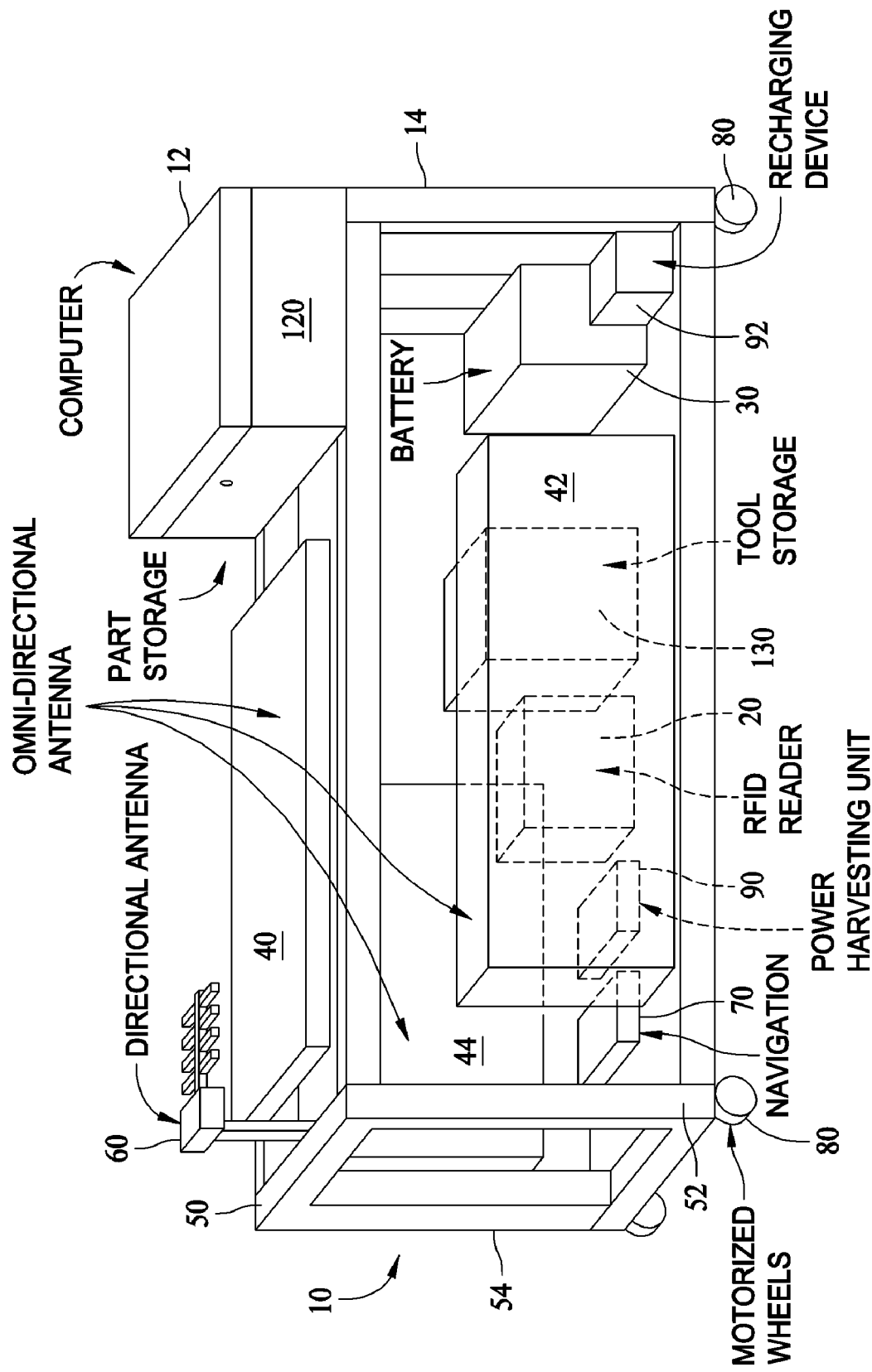
FIG. 1 is a schematic diagram of one embodiment of a mobile RFID reader.

Now referring to the Figures, FIG. 1 is a schematic diagram of one embodiment of a mobile RFID reader 10. In the illustrated embodiment, mobile RFID reader 10 includes a computer 12 which is mounted on a wheeled cart 14. The computer is utilized for processing of information received from RFID tags (not shown). Also mounted on cart 14 is a RFID reader 20 that is communicatively coupled to computer 12. RFID reader 20 interrogates and receives information from the afore mentioned RFID tags and forwards the information to computer 12 for processing and any analysis.

Both computer 12 and RFID reader 20 are powered by a battery 30, as are other devices and options associated with mobile RFID reader 10, as further described below. Referring specifically to battery 30, in one embodiment, it is a rechargeable, extended use battery for extended operational capability. In a specific embodiment, battery 30 is a twelve volt, 86 ampere hour battery.

A plurality of omni-directional antennas 40, 42, and 44 are communicatively coupled to RFID reader 20 and also mounted to cart 14. Antennas 40, 42, and 44 are oriented to provide a broad area of coverage with a correspondingly strong signal in all directions. In the illustrated embodiment, antenna 40 is parallel with a top surface 50 of cart 14, antenna 42 is substantially coplanar with a first side 52 of cart 14, and antenna 44 is substantially coplanar with a second side 54 of cart 14. In one embodiment, antennas 40, 42, and 44 are each high gain omni-directional antennas, for example, providing one watt of output power, providing system 10 with a capability for energizing RFID tags and receiving data from those RFID tags which may be located 20 feet or more away from mobile RFID reader 10.

A directional antenna 60 is also communicatively coupled to RFID reader 20 and is mounted to cart 14. Directional antenna 60 provides for further extended range operation capability by focusing the energy from the directional antenna 60 in a specific direction or towards a specific location. In addition, omni-directional antennas 40, 42, and 44 can be selectively energized by the communicatively coupled computer 20 for further extended range operation capability by focusing the energy of the omni-directional antennas 40, 42, and 44. This capability provides system 10 with an ability, for example, to locate a specific asset.

Various interconnections between RFID reader 20 and antennas 40, 42, 44, and 60, in specific embodiments, are controlled via a user interface that is displayed on a display of computer 12. For example, if mobile RFID reader 10 if operating in an area where it is known that the RFID tags to be read are all to the right of cart 14, a user may switch all of the power from RFID reader 20 to antenna 44. To extend a range of mobile RFID reader 10, the user may switch the connection to the RFID reader 20 from one or more of the omni-directional antennas 40, 22, and 44 to antenna 60.

In one embodiment, mobile RFID reader 10 is configured with a navigation unit 70 which, in conjunction with a propulsion device (e.g., motorized wheels 80), can be utilized to cause mobile RFID reader 10 to move along one or more defined routes while interrogating and received data from RFID tags. In a specific embodiment, navigation unit 70 includes a remote control system. In such an embodiment, the remote control system of navigation unit 70 may be operated to directly control operation of motorized wheels 80, and thus movement of RFID system 10.

Another embodiment of mobile RFID system 10 has an independent navigation capability provided by navigation unit 70. In this embodiment, navigation unit 70 is capable of being programmed with various routes the mobile RFID system can navigate. With this configuration, navigation unit 70 provides an ability to navigate mobile RFID system 10 without any external inputs other than the selection of one of the preprogrammed navigation routes.

Another embodiment of mobile RFID system 10 has an independent navigation capability provided by navigation unit 70. The independent navigation capability provided by navigation unit 70 can rely on a GPS navigation receiver, motion sensors, and proximity sensors. In such a configuration, the navigation unit 70 provides an ability to navigate mobile RFID system 10 with available external inputs with or without the selection of one of the preprogrammed navigation routes.

In another embodiment, mobile RFID system 10 is configured to include a power harvesting capability, illustrated in FIG. 1 by power harvesting unit 90. In various embodiments, power is harvested by power harvesting unit 90 and may be obtained from one or more of wheel movement, solar cells mounted to cart 14 (not shown), or a fuel-cell system mounted to cart 14 (not shown). Power harvesting may provide power, for example, to recharge battery 30 through recharging device 92, operate a remote control system within navigation unit 70, operate a motion sensor system associated with mobile RFID system 10 as further described herein, reduce the total battery power consumption of mobile RFID system 10, and provide power to other devices mounted to cart 14.

In one specific embodiment and as mentioned above, mobile RFID system 10 is configured to include a motion sensor that is attached to cart 14 and communicatively coupled to computer 12. The motion sensor is utilized in the embodiment to assist in navigation of the mobile RFID system 10 and further utilized for power conservation by regulating power levels consumed by the various components of mobile RFID system 10 while in motion or at rest.

In at least one embodiment, mobile RFID system 10 is configured to include wireless capability, including for example, a wireless networking capability within computer 12. The wireless capability may augment or enable, for example, the remote control capability of navigation unit 70 by providing remote control instructions via the wireless network to computer 12, and on to navigation unit 70. The wireless networking capability also enables connectivity between mobile RFID system 10 (via computer 12) and fixed data assets, such as a computer network, for asset configuration control. Such a wireless capability allows for operation of mobile RFID system 10 with a minimal user interface while, as mentioned above, accommodating remote access to networks or fixed data storage systems. Such a wireless network connectivity allows mobile RFID system 10 to maintain configuration control for RFID tagged environments, via the wireless connection, to fixed data storage systems while operating in remote or isolated locations.

Additionally, one embodiment of mobile RFID system 10 includes a parts storage bin 120 and a tool storage bin 130 to provide system 10 with a parts storage, tool storage, and carriage capabilities.

Through programming of computer 12, mobile RFID system 10 provides one or both of a part accountability capability and a tool accountability capability. More specifically, parts and/or tools can be automatically inventoried and accounted for, as they are installed or removed from the inventory of mobile RFID system 10, via an interface with a self-contained asset management system running on computer 12.

Figure 2:
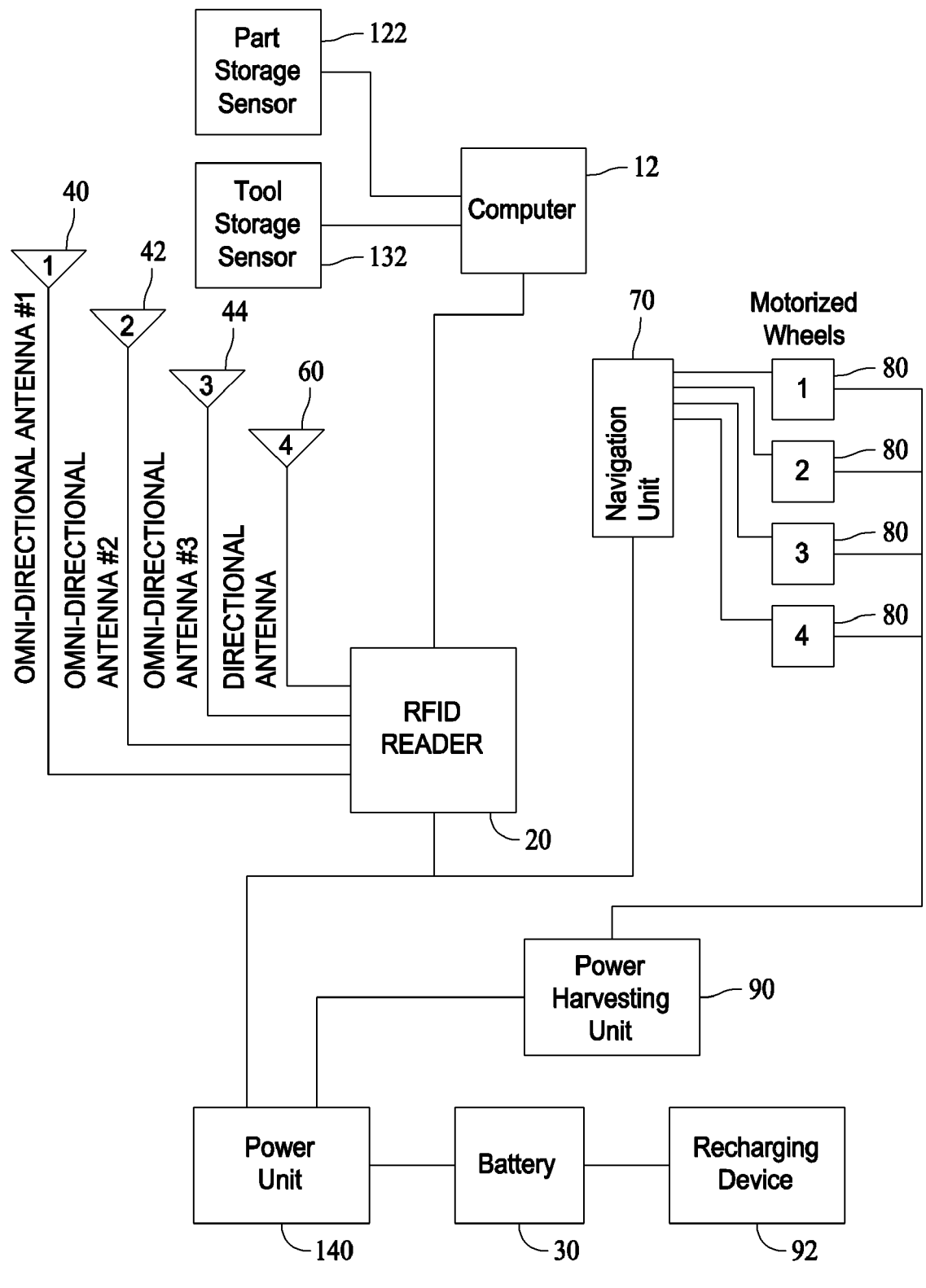
FIG. 2 is an electrical block diagram of the mobile RFID reader of FIG. 1.

FIG. 2 is an electrical block diagram of the mobile RFID reader 10 of FIG. 1. Computer 12 controls operation of the fixed RFID reader 20, including the selective coupling of omni-directional antennas 40, 42, and 44 and directional antenna 60. As described elsewhere herein, in a specific embodiment, computer 12 is configured for selectively couple one or more of the omni-directional antennas 40, 42, and 44 to the RFID reader 20 to provide a mass interrogation capability of RFID tags. Additionally, computer 12 is configured for selectively couple the directional antenna 60 to the RFID reader 20 to focus RF energy in a specific direction for the purpose of activating RFID tags that are somewhat distant from the cart 14 (shown in FIG. 1).

Mobile RFID reader 10 may also include a part storage sensor 122 and a tool storage sensor 132. These sensors 122 and 132 are activated when a user of mobile RFID reader 10 accesses the respective above described parts storage bin 120 and tool storage bin 130. In a particular embodiment, once one of the sensors has been activated, the computer 12 programmed to prompt a user to perform an inventory of the tools or parts (depending on which sensor(s) were activated). Such a prompt is helpful with parts and tool accountability as further described below.

Computer 12 is also configured to control operation of navigation unit 70 which in turn separately controls operation of each of the motorized wheels 80, enabling mobile RFID reader 10 to navigate along a desired route as described herein. The motorized wheels 80 are coupled to power harvesting unit 90. Specifically, movement of the motorized wheels 80 allows energy to be generated, which is then captured by the power harvesting unit 90.

A power unit 140 (not shown in FIG. 1), receives power from battery 30 and power harvesting unit 90 and distributes power to the computer 12, RFID reader 20, and navigation unit 70 (which then distributes power to motorized wheels 80) as shown in the Figure. While not directly connected to antennas 40, 42, 44, and 60, the power unit 140 also serves as the source of power that is radiated through the antennas via RFID reader 20.

In various embodiments, mobile RFID system 10 is fabricated utilizing commercial off-the-shelf (COTS) RFID fixed readers, high gain omni-directional antennas, and directional antennas. Additionally, system 10 may be implemented utilizing COTS laptop or tablet computer systems, and COTS self-sustained power supply (e.g., battery) systems. Through the programming and operation of computer 12, mobile RFID system 10 is utilized to detect, capture, and interrogate EPC-compliant RFID tag data, for example, to verify and maintain an inventory of RFID tags items within a specific environment.

One such example is verification of an RFID tagged inventory of flotation devices within an aircraft. In such a scenario, mobile RFID system 10 is programmed to move down the aisle or aisles of the aircraft while transmitting a signal that originates from RFID reader 20 and activates (e.g., interrogates) the RFID tags on the items within the aircraft. Data from the activated RFID tags is then received at the RFID reader 20, having been transmitted by the activated RFID tags. The received RFID data is compared, for example, against a previously stored inventory within computer 12 to verify the inventory of flotation devices is within the aircraft, and that, the inspection dates for the floatation devices are up to date. In at least one embodiment, mobile RFID system 10 and the RFID tags operate in the ultra high frequency (UHF) spectrum.

With regard to the above described tool storage capability, in such an embodiment, computer 12 is programmed to include a tool accountability feature. Such a feature results in the capability of mobile RFID system 10 to provide an inventory of RFID tagged tools within the tool storage capability, and notify a user regarding any tools within the inventory that are not within the tool storage capability upon completion of a maintenance action. In such a scenario, once the maintenance action was complete, the user would operate system 10 at a power output level that would activate RFID tags associated with the tools only in the immediate vicinity of mobile RFID reader 10. Upon receiving the responses from those activated RFID tags, computer 12 is operable to compare the received responses against an inventory of tools that is associated with mobile RFID reader 10.

Similarly, when mobile RFID reader 10 is configured with a part storage capability, computer 12 is programmed to include a parts accountability feature. Such a feature results in the capability of mobile RFID system 10 to provide an inventory of RFID tagged parts within the part storage capability, and allow the user to remove the parts from the computer-based inventory as they are used. The user may also utilize the computer to add parts that have been replaced to an replaced parts inventory. In all of the scenarios, the functions and results are essentially the same, that is, to provide a capability to notify a user regarding any parts that are no longer within the inventory and that were not utilized as replacement parts upon completion of a maintenance action.

Another embodiment for system 10 relates to a mobile RFID system 10 where a computer 12 within the system 10 includes an inventory for RFID tagged items, for example, within an aircraft. In the embodiment, the mobile RFID system 10 is operable to navigate along a route within the aircraft, selectively utilize the above described directional antenna 60 and at least one of the omni-directional antennas 40, 42, and 44 to activate the RFID tags within the aircraft environment utilizing the RFID reader 20 and receive data from the activated RFID tags related to the respective RFID tagged items within the environment. Computer 12 is utilized to determine any differences between a stored inventory of RFID tagged items and the RFID tags from which data was received, and alert a user to any maintenance actions or life limited items for the items associated with the RFID tags from which data was received.

The above allows for a method for activating RFID tags, receiving and utilizing the data associated with a plurality of RFID tags within an environment that includes navigating the RFID reader 20 and the antennas 40, 42, 44, and 60 along a route, selectively coupling the directional antenna 60 and at least one omni-directional antenna 40, 42, and 44 to the RFID reader 20, based on a varying configuration of the RFID environment along the route, to activate the RFID tags with the RFID reader 20, receiving data at the RFID reader 20 from one or more activated RFID tags, and relating the received data to an inventory of respective RFID tagged items within the environment as part of an asset management process for the RFID tagged items.

Relating the received data to an inventory of respective RFID tagged items typically includes one or more of determining for which RFID tagged items in the inventory data was not received by the RFID reader 20, determining if any of the data received by the RFID reader 20 is not associated with an RFID tagged item in the inventory, and determining, from the data received by the RFID reader 20, if a maintenance action is due for any of the RFID tagged items in the inventory.

As described herein, utilization of the multiple, high-performance omni-directional antennas provides for an increased power output when compared to known handheld RFID devices that incorporate small, low-performance antennas. The realistic read ranges of these known handheld RFID devices is thought to be in the range of approximately two to four feet. The high-performance antennas of mobile RFID system 10 when combined with RFID reader 12, have a range in excess of 20 feet. In addition, the power output of individual or multiple omni-directional and directional antennas can be varied and controlled independently by the computer application. When powered by battery 30, mobile RFID system 10 described herein is capable of operating in a constant RFID tag interrogate/read state for up to about ten hours.

Other advantages provided by mobile RFID system 10 include the utilization of many commercial, off-the-shelf, components including the high-performance antennas, computers, and RFID reader devices, increased system power output for RFID tag interrogation, increased performance and accuracy of the data collection process, and reduction of man-hours needed to perform manual inspections of critical assets as in the flotation example explained above.

Those skilled in the art will understand that the ultimate size or footprint of the mobile RFID system 10 is determined by analysis of use-case results. For example, in an aircraft environment, where mobile RFID system 10 is to be utilized in aircraft aisles, system 10 will be configured to be somewhat narrower than in other applications where space is not at such a premium. In other words, system 10 is flexible, it can be smaller or larger, dependent on the environment and conditions under which it operates.

While the invention has been described in terms of various specific embodiments, those skilled in the art will recognize that the invention can be practiced with modification within the spirit and scope of the claims.

What is claimed is:

1. A mobile radio frequency identification (RFID) system comprising:
    a wheeled cart;
    a fixed RFID reader mounted to said wheeled cart;
    a computer mounted to said wheeled cart and communicatively coupled to said RFID reader for operational control of said RFID reader;
    a directional antenna capable of being communicatively coupled to said RFID reader, said directional antenna movably mounted to said wheeled cart for focusing of RF energy in a specific direction; and
    at least one omni-directional antenna mounted to said wheeled cart and capable of being communicatively coupled to said RFID reader to provide a mass RFID tag interrogation capability, said computer configured to process data received from RFID tags associated with said system to provide an inventory of RFID tagged items and update the inventory as items are added and removed, and further configured to allow a user to selectively couple one or both of said at least one omni-directional antenna and said directional antenna to said RFID reader.

2. The mobile RFID system according to claim 1 further comprising a power source configured to supply power to at least said computer and said RFID reader.

3. The mobile RFID system according to claim 1 wherein said at least one omni-directional antenna further comprises:
    a first omni-directional antenna substantially parallel with a top surface of said wheeled cart;
    a second omni-directional antenna substantially coplanar with a first side of said wheeled cart; and
    a third omni-directional antenna substantially coplanar with a second side of said wheeled cart.

4. The mobile RFID system according to claim 1 wherein said at least one omni-directional antenna and said directional antenna are configured to output a signal of sufficient strength to allow communication with the RFID tags associated with said system at least 20 feet from said mobile RFID system.

5. The mobile RFID system according to claim 1 further comprising a battery source configured to provide power at least to said computer and said RFID reader.

6. The mobile RFID system according to claim 5 wherein said wheeled cart further comprises a power harvesting capability, the harvested power configured for at least one of charging said battery source and providing power to said computer and said RFID reader.

7. The mobile RFID system according to claim 6 wherein said power harvesting capability comprises at least one of:
    a capability of harvesting power from the movement of wheels associated with said wheeled cart;
    at least one solar cell associated with said wheeled cart; and
    a fuel-cell system associated with said cart.

8. The mobile RFID system according to claim 1 further comprising a navigation unit, said navigation unit programmed with at least one route over which said mobile RFID system is to be navigated, said navigation unit operable to move said wheeled cart over the at least one route.

9. The mobile RFID system according to claim 1 wherein said computer comprises an interface to a wireless network, said mobile RFID system configured for at least one of remotely controlling a position of said mobile RFID system, enabling a connectivity between said mobile RFID system and at least one fixed data asset for configuration control of an RFID tag environment.

10. The mobile RFID system according to claim 1 further comprising a motion sensor attached to said cart and communicatively coupled to said computer, said motion sensor and said computer configured to regulate power levels consumed by one or more components of said mobile RFID system based on movement or non-movement of said cart.

11. The mobile RFID system according to claim 1 further comprising a tool storage capability, said computer comprising a tool accountability feature, said computer operable to:
    provide an inventory of RFID tagged tools within said tool storage capability; and
    notify a user regarding any tools from the inventory that are not within said tool storage capability upon completion of a maintenance action.

12. The mobile RFID system according to claim 1 further comprising a part storage capability, said computer comprising a parts accountability feature, said computer operable to:
    provide an inventory of RFID tagged parts within said part storage capability; and
    update the inventory as RFID tagged parts are removed from and placed into said parts storage capability.

13. The mobile RFID system according to claim 1 wherein said computer comprises an inventory for RFID tagged items within an aircraft, and wherein said mobile RFID system is operable to:
    navigate along a route within the aircraft;
    selectively utilize said directional antenna and said at least one omni-directional antenna to activate the RFID tags associated with said system with said RFID reader; and
    receive data from the activated RFID tags related to the respective RFID tagged items within the environment.

14. The mobile RFID system according to claim 13 wherein said computer is programmed for at least one of:
    determination of any differences between a stored inventory of RFID tagged items and the RFID tags associated with said system from which data was received; and
    alert a user to any maintenance actions or life limited items for the items associated with the RFID tags associated with said system from which data was received.

15. A radio frequency identification (RFID) system comprising:
    a fixed RFID reader;
    a computer communicatively coupled to said RFID reader for operational control of said RFID reader;
    a directional antenna capable of being communicatively coupled to said RFID reader; and
    at least one omni-directional antenna capable of being communicatively coupled to said RFID reader, said computer configured for selectively coupling said at least one omni-directional antenna to said RFID reader to provide a mass RFID tag interrogation capability and said directional antenna to said RFID reader to focus RF energy in a specific direction said computer further configured to provide an inventory of RFID tagged items and update the inventory as the RFID items are added and removed.

16. The radio frequency identification (RFID) system according to claim 15 further comprising a wheeled cart, said wheeled cart configured for transportation of said RFID reader, said computer, said directional antenna and said at least one omni-directional antenna.

17. The radio frequency identification (RFID) system according to claim 15 further comprising a battery source configured to provide power at least to said computer and said RFID reader.

18. A method for activating, receiving data from, and utilizing the data associated with a plurality of RFID tags within an environment, the RFID tags activated and the data received utilizing an RFID reader, a directional antenna for focusing of RF energy in a specific direction, and at least one omni-directional antenna for providing a mass RFID tag interrogation capability, said method comprising:
  navigating the RFID reader and the antennas along a route;
  selectively coupling the directional antenna and at least one omni-directional antenna to the RFID reader, based on a varying configuration of the RFID environment along the route, to activate the RFID tags with the RFID reader;
  receiving data at the RFID reader from one or more activated RFID tags; and
  relating the received data to an inventory of respective RFID tagged items within the environment as part of an asset management process for the RFID tagged items.

19. The method according to claim 18 wherein relating the received data to an inventory of respective RFID tagged items comprises at least one of:
  determining for which RFID tagged items in the inventory data was not received by the RFID reader;
  determining if any of the data received by the RFID reader is not associated with an RFID tagged item in the inventory; and
  determining, from the data received by the RFID reader, if a maintenance action is due for any of the RFID tagged items in the inventory.

20. The method according to claim 18 wherein navigating the RFID reader and the antennas along a route comprises at least one of:
  utilizing a navigation unit to move the RFID reader and antennas along the route; and
  controlling movement of the RFID reader and the antennas along the route utilizing a wireless network.

* * * * *